US012566625B2

(12) United States Patent
Mackenbach et al.

(10) Patent No.: US 12,566,625 B2
(45) Date of Patent: Mar. 3, 2026

(54) ESTABLISHMENT OF SERVICE MESHES BETWEEN VIRTUAL COMPUTING INSTANCES AND EXTERNAL DEVICES

(71) Applicant: Dell Products L.P., Round Rock, TX (US)

(72) Inventors: Jeroen Diederik Cornelis Antonius Mackenbach, Roosendaal (NL); Jeremy Christian Phelps, Venice, FL (US); Alessandra Oliveira da Silva, Atlanta, GA (US)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 18/367,796

(22) Filed: Sep. 13, 2023

(65) Prior Publication Data

US 2025/0085993 A1      Mar. 13, 2025

(51) Int. Cl.
    *G06F 9/45*        (2006.01)
    *G06F 9/455*       (2018.01)
(52) U.S. Cl.
    CPC ..................... *G06F 9/45558* (2013.01); *G06F 2009/45579* (2013.01); *G06F 2009/45595* (2013.01)
(58) Field of Classification Search
    None
    See application file for complete search history.

(56) References Cited

U.S. PATENT DOCUMENTS

| | | | | |
|---|---|---|---|---|
| 11,977,493 | B2 * | 5/2024 | Tsirkin | ............... G06F 12/1081 |
| 12,334,449 | B2 * | 6/2025 | Subbareddy | ........ H01L 23/5386 |
| 2020/0159439 | A1 * | 5/2020 | Hyung | .................... G06F 3/061 |

OTHER PUBLICATIONS

Alsa Project, "Advanced Linux Sound Architecture (ALSA) Project Homepage," https://www.alsa-project.org/wiki/Main_Page, Oct. 20, 2020, 2 pages.
A. Verma et al., "Blockchain for Industry 5.0: Vision, Opportunities, Key Enablers, and Future Directions," IEEE Access, Jul. 5, 2022, 40 pages, vol. 10.
COMEDI—Control and Measurement Interface, "Comedi Linux Control and Measurement Device Interface," Obtained from Internet on Aug. 25, 2023, 2 pages.

(Continued)

*Primary Examiner* — Craig C Dorais
(74) *Attorney, Agent, or Firm* — Ryan, Mason & Lewis, LLP

(57)        ABSTRACT
An apparatus comprises at least one processing device configured to receive a request, from an application running on a virtual computing instance, to consume data from an external device coupled to a physical hardware port of a host device, the external device having a first interface with a physical driver running on a host operating system of the host device, the first interface having a first interface type. The processing device is also configured to instantiate a second interface on the host operating system of the host device, the second interface having a second interface type different than the first interface type. The processing device is further configured to establish a service mesh for the application by linking the instantiated second interface with (i) a virtual driver running on the virtual computing instance and (ii) the physical driver running on the host operating system of the host device.

20 Claims, 12 Drawing Sheets

MAINTAIN A REGISTER OF INTERFACE ENDPOINTS FOR ONE OR MORE EXTERNAL DEVICES COUPLED TO ONE OR MORE PHYSICAL HARDWARE PORTS OF ONE OR MORE HOST DEVICES AND ONE OR MORE VIRTUAL PORTS ASSOCIATED WITH ONE OR MORE VIRTUAL DEVICES RUNNING ON ONE OR MORE VIRTUAL COMPUTING INSTANCES — 250

GENERATE, IN RESPONSE TO ESTABLISHMENT OF A GIVEN SERVICE MESH ENABLING A GIVEN APPLICATION RUNNING ON A GIVEN ONE OF THE ONE OR MORE VIRTUAL COMPUTING INSTANCES TO CONSUME DATA FROM A GIVEN ONE OF THE ONE OR MORE EXTERNAL DEVICES COUPLED TO A GIVEN ONE OF THE ONE OR MORE PHYSICAL HARDWARE PORTS OF A GIVEN ONE OF THE ONE OR MORE HOST DEVICES, A GIVEN LOGICAL-TO-PHYSICAL MAPPING BETWEEN (I) A GIVEN VIRTUAL IDENTIFIER OF A FIRST INTERFACE ENDPOINT IN THE REGISTER OF INTERFACE ENDPOINTS ASSOCIATED WITH A GIVEN ONE OF THE ONE OR MORE VIRTUAL PORTS ASSOCIATED WITH A GIVEN ONE OF ONE OR MORE VIRTUAL DEVICES RUNNING ON THE GIVEN VIRTUAL COMPUTING INSTANCE AND (II) A GIVEN PHYSICAL IDENTIFIER OF A SECOND INTERFACE ENDPOINT IN THE REGISTER OF INTERFACE ENDPOINTS ASSOCIATED WITH THE GIVEN EXTERNAL DEVICE COUPLED TO THE GIVEN PHYSICAL HARDWARE PORT OF THE GIVEN HOST DEVICE — 252

CONTROL EXCHANGE OF DATA FOR THE GIVEN SERVICE MESH BASED AT LEAST IN PART ON THE GIVEN LOGICAL-TO-PHYSICAL MAPPING AND ONE OR MORE POLICIES — 254

(56) References Cited

OTHER PUBLICATIONS

The Linux Driver Implementer's API Guide, "General Purpose Input/Output (GPIO)," Mar. 8, 2023, 42 pages.

X. Xu et al., "Industry 4.0 and Industry 5.0—Inception, Conception and Perception," Journal of Manufacturing Systems, Oct. 8, 2021, pp. 530-535, vol. 61.

"Low Level Serial NPI," kernel.org/Doc/Documentation/serial/driver, Obtained from Internet on Aug. 25, 2023, 8 pages.

linuxtv.org, "Multimedia and Television Support on Linux," https://www.linuxtv.org, Obtained from Internet on Aug. 25, 2023, 2 pages.

M. Šverko et al., "SCADA Systems With Focus on Continuous Manufacturing and Steel Industry: A Survey on Architectures, Standards, Challenges and Industry 5.0," Oct. 3, 2022, pp. 109395-109430, vol. 10.

The Linux Kernel Documentation, "SocketCAN—Controller Area Network," https://www.kernel.org/doc/html/latest/networking/can.html, Obtained from Internet on Aug. 25, 2023, 26 pages.

Johan Hovold, "The GNSS Subsystem," Open Source Summit Europe, Edinburgh, Oct. 24, 2018, 32 pages.

analog.com, "What is Libiio? Analog Devices Wiki," https://wiki.analog.com/resources/tools-software/linus-software/libiio, Nov. 17, 2014, 7 pages.

The Linux Foundation, "Why Edge X?" https://www.edgexfoundry.org/why-edgex/, Obtained from Internet on Aug. 25, 2023, 8 pages.

* cited by examiner

100

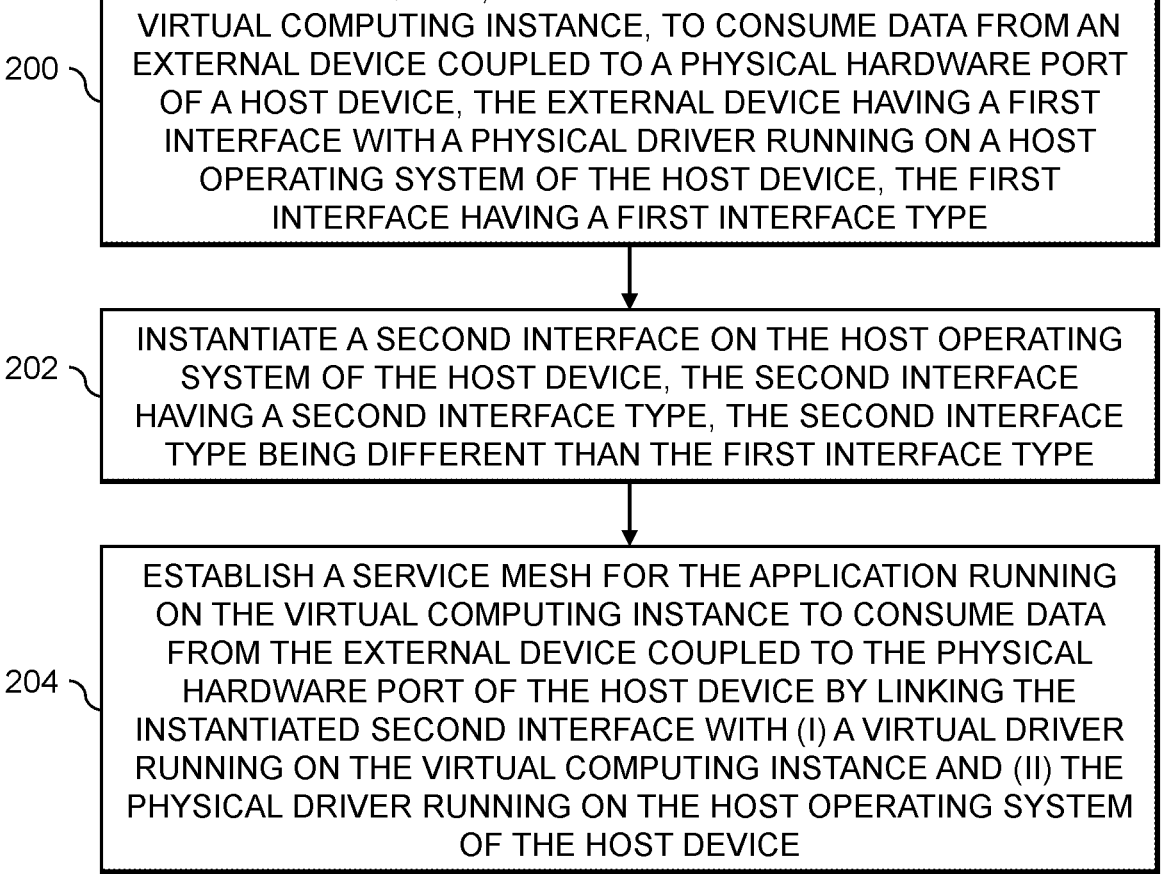

200 — RECEIVE A REQUEST, FROM AN APPLICATION RUNNING ON A VIRTUAL COMPUTING INSTANCE, TO CONSUME DATA FROM AN EXTERNAL DEVICE COUPLED TO A PHYSICAL HARDWARE PORT OF A HOST DEVICE, THE EXTERNAL DEVICE HAVING A FIRST INTERFACE WITH A PHYSICAL DRIVER RUNNING ON A HOST OPERATING SYSTEM OF THE HOST DEVICE, THE FIRST INTERFACE HAVING A FIRST INTERFACE TYPE

202 — INSTANTIATE A SECOND INTERFACE ON THE HOST OPERATING SYSTEM OF THE HOST DEVICE, THE SECOND INTERFACE HAVING A SECOND INTERFACE TYPE, THE SECOND INTERFACE TYPE BEING DIFFERENT THAN THE FIRST INTERFACE TYPE

204 — ESTABLISH A SERVICE MESH FOR THE APPLICATION RUNNING ON THE VIRTUAL COMPUTING INSTANCE TO CONSUME DATA FROM THE EXTERNAL DEVICE COUPLED TO THE PHYSICAL HARDWARE PORT OF THE HOST DEVICE BY LINKING THE INSTANTIATED SECOND INTERFACE WITH (I) A VIRTUAL DRIVER RUNNING ON THE VIRTUAL COMPUTING INSTANCE AND (II) THE PHYSICAL DRIVER RUNNING ON THE HOST OPERATING SYSTEM OF THE HOST DEVICE

FIG. 2A

Figure 2B:
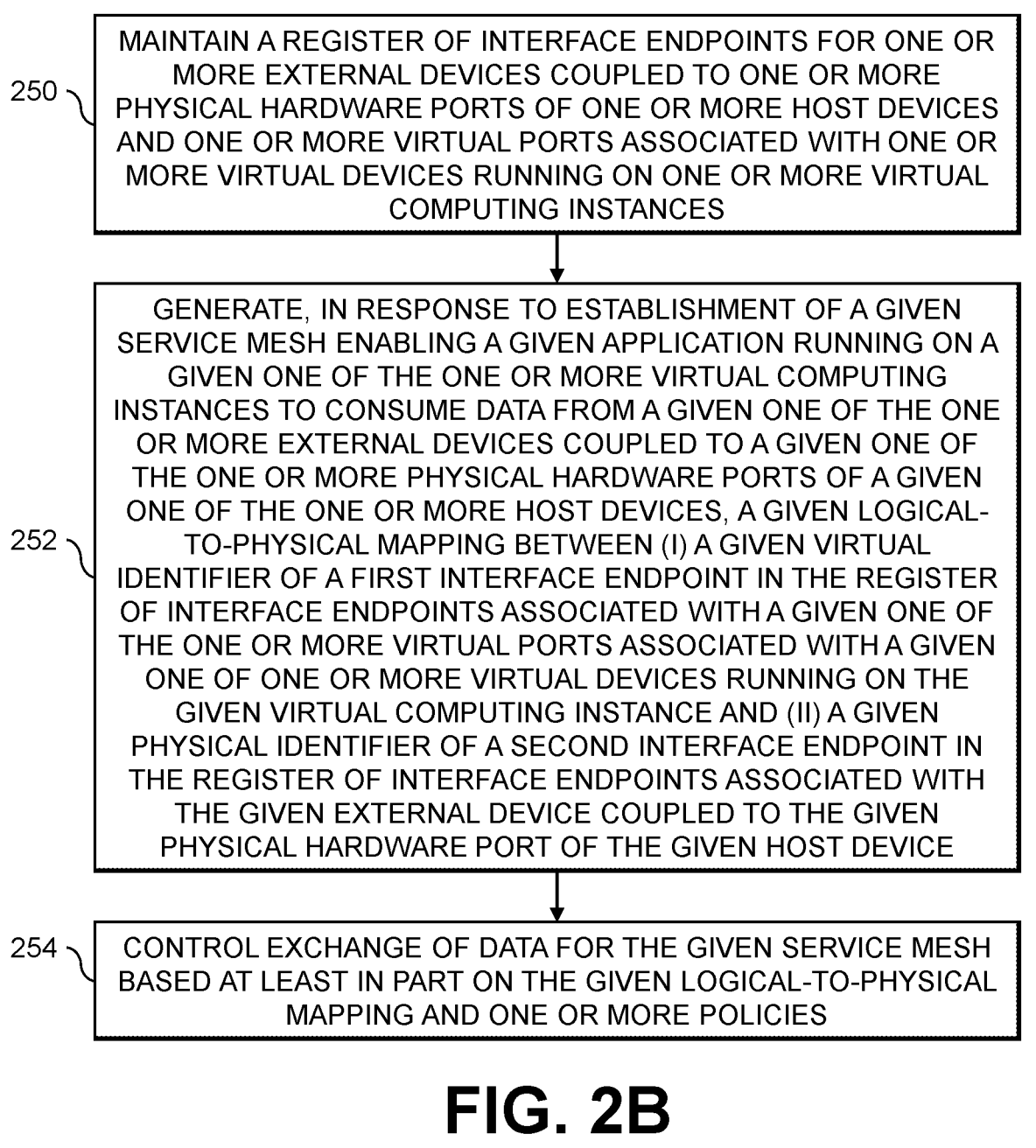

250 — MAINTAIN A REGISTER OF INTERFACE ENDPOINTS FOR ONE OR MORE EXTERNAL DEVICES COUPLED TO ONE OR MORE PHYSICAL HARDWARE PORTS OF ONE OR MORE HOST DEVICES AND ONE OR MORE VIRTUAL PORTS ASSOCIATED WITH ONE OR MORE VIRTUAL DEVICES RUNNING ON ONE OR MORE VIRTUAL COMPUTING INSTANCES

252 — GENERATE, IN RESPONSE TO ESTABLISHMENT OF A GIVEN SERVICE MESH ENABLING A GIVEN APPLICATION RUNNING ON A GIVEN ONE OF THE ONE OR MORE VIRTUAL COMPUTING INSTANCES TO CONSUME DATA FROM A GIVEN ONE OF THE ONE OR MORE EXTERNAL DEVICES COUPLED TO A GIVEN ONE OF THE ONE OR MORE PHYSICAL HARDWARE PORTS OF A GIVEN ONE OF THE ONE OR MORE HOST DEVICES, A GIVEN LOGICAL-TO-PHYSICAL MAPPING BETWEEN (I) A GIVEN VIRTUAL IDENTIFIER OF A FIRST INTERFACE ENDPOINT IN THE REGISTER OF INTERFACE ENDPOINTS ASSOCIATED WITH A GIVEN ONE OF THE ONE OR MORE VIRTUAL PORTS ASSOCIATED WITH A GIVEN ONE OF ONE OR MORE VIRTUAL DEVICES RUNNING ON THE GIVEN VIRTUAL COMPUTING INSTANCE AND (II) A GIVEN PHYSICAL IDENTIFIER OF A SECOND INTERFACE ENDPOINT IN THE REGISTER OF INTERFACE ENDPOINTS ASSOCIATED WITH THE GIVEN EXTERNAL DEVICE COUPLED TO THE GIVEN PHYSICAL HARDWARE PORT OF THE GIVEN HOST DEVICE

254 — CONTROL EXCHANGE OF DATA FOR THE GIVEN SERVICE MESH BASED AT LEAST IN PART ON THE GIVEN LOGICAL-TO-PHYSICAL MAPPING AND ONE OR MORE POLICIES

| Type | Class | Device Port Mapping |
|------|-------|---------------------|
| Serial | LibSerial | /dev/ttySx |
| General Purpose Input/Output (GPIO) | LibGPIO | /dev/giochipx |
| Sensor | LibIIO | /dev/IIOx |
| Labcard | LIBComedi | /dev/comedix |
| Video | LIBUVC | /dev/videox |
| Audio | LibAlsa | /dev/dspx |

FIG. 4

ESTABLISHMENT OF SERVICE MESHES BETWEEN VIRTUAL COMPUTING INSTANCES AND EXTERNAL DEVICES

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems. Similar challenges arise in other types of information processing systems.

SUMMARY

Illustrative embodiments of the present disclosure provide techniques for establishment of service meshes between virtual computing instances and external devices.

In one embodiment, an apparatus comprises at least one processing device comprising a processor coupled to a memory. The at least one processing device is configured to receive a request, from an application running on a virtual computing instance, to consume data from an external device coupled to a physical hardware port of a host device, the external device having a first interface with a physical driver running on a host operating system of the host device, the first interface having a first interface type. The at least one processing device is also configured to instantiate a second interface on the host operating system of the host device, the second interface having a second interface type, the second interface type being different than the first interface type. The at least one processing device is further configured to establish a service mesh for the application running on the virtual computing instance to consume data from the external device coupled to the physical hardware port of the host device by linking the instantiated second interface with (i) a virtual driver running on the virtual computing instance and (ii) the physical driver running on the host operating system of the host device.

These and other illustrative embodiments include, without limitation, methods, apparatus, networks, systems and processor-readable storage media.

BRIEF DESCRIPTION OF THE DRAWINGS

FIGS. 2A and 2B are flow diagrams of exemplary processes for establishment and management of service meshes established between virtual computing instances and external devices connected to host devices in an illustrative embodiment.

FIG. 4 shows a table of external device types and associated classes and device port mapping in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
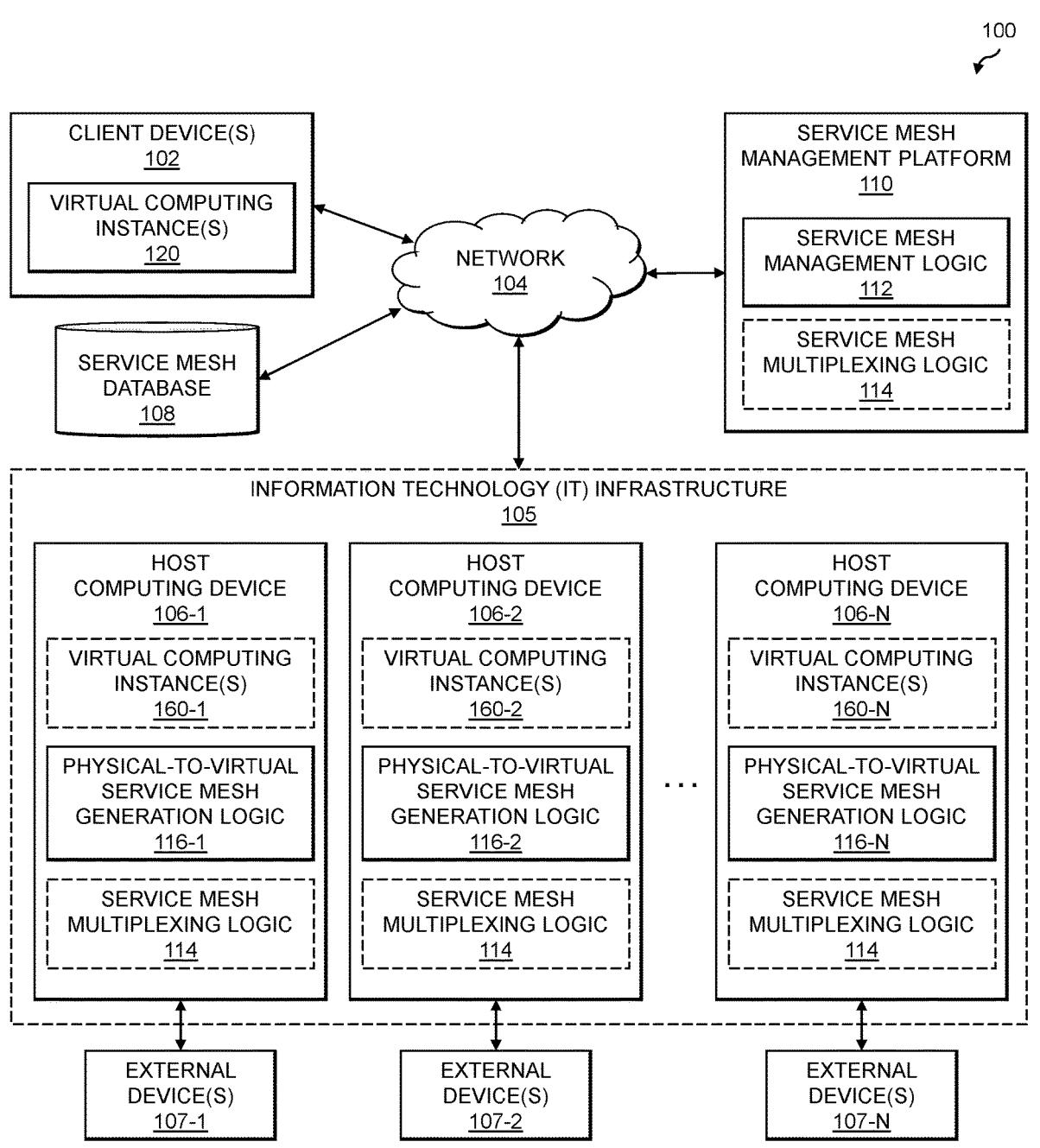
FIG. 1 is a block diagram of an information processing system configured for establishment and management of service meshes established between virtual computing instances and external devices connected to host devices in an illustrative embodiment.

FIG. 1 shows an information processing system 100 configured in accordance with an illustrative embodiment. The information processing system 100 is assumed to be built on at least one processing platform and provides functionality for establishment and management of physical-to-virtual service meshes (e.g., between physical drivers and virtual drivers) enabling virtual computing instances to consume data from external devices connected to host computing devices. The physical-to-virtual service meshes, also referred to herein as service meshes, allow applications which run on virtual computing instances to transparently consume data from the external devices. The physical driver in some embodiments maps equally to the virtual driver, allowing transparent operation of applications whether such applications are in a bare metal, virtual or container workload running anywhere geographically that is linked by the service mesh. The information processing system 100 includes one or more client devices 102 which are coupled to a network 104. Also coupled to the network 104 is an information technology (IT) infrastructure 105 (e.g., an edge or other data center) comprising host computing devices 106-1, 106-2, . . . 106-N (collectively, host computing devices 106) which are connected to respective sets of one or more external devices 107-1, 107-2, . . . 107-N (collectively, external devices 107). The host computing devices 106 are examples of assets of the IT infrastructure 105, and thus may be referred to as IT assets. Also coupled to the network 104 is a service mesh database 108 and a service mesh management platform 110. The host computing devices 106 may include physical hardware such as servers, storage systems, networking equipment, and other types of processing and computing devices. The external devices 107 may comprise sensor devices such as Internet of Things (IoT) devices, peripherals, etc. which are connected to physical ports of the host computing devices 106. The client devices 102 may run one or more virtual computing instances 120 and the host computing devices 106-1, 106-2, . . . 106-N may run one or more virtual computing instances 160-1, 160-2, . . . 160-N (collectively, virtual computing instances 160). The virtual computing instances 120 and 160 may comprise, for example, virtual machines (VMs), containers, microservices, etc.

In some embodiments, the service mesh management platform 110 is used for an enterprise system. For example, an enterprise may subscribe to or otherwise utilize the service mesh management platform 110 to manage physical-to-virtual service meshes which are established between the external devices 107 and one or more of the virtual computing instances 120 and 160. Users of the enterprise (e.g., support technicians, field engineers or other employees, customers or users, etc.) which are associated with the one or more client devices 102 may utilize the service mesh management platform 110 to manage physical-to-virtual service meshes established between the external devices 107 and one or more of the virtual computing instances 120 and 160. This allows consumption of data from the external devices 107 by various applications running on the virtual computing instances 120 and 160. As used herein, the term "enterprise system" is intended to be construed broadly to include any group of systems or other computing devices. For example, the IT infrastructure 105 may provide a portion of one or more enterprise systems. A given enterprise system may also or alternatively include the one or more client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as mobile telephones, laptop computers, tablet computers, or other types of devices utilized by one or more members of an enterprise, in any combination. Such devices are examples of what are more generally referred to herein as "processing devices." Some of these processing devices are also generally referred to herein as "computers."

The client devices 102 in some embodiments comprise computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The service mesh database 108 is configured to store and record various information that is utilized by the service mesh management platform 110 for managing and multiplexing across physical-to-virtual service meshes established between one or more of the external devices 107 and one or more of the virtual computing instances 120 and 160. The information may include, for example, mappings between physical drivers (e.g., running on one or more of the host computing devices 106) and virtual drivers (e.g., running on one or more of the virtual computing instances 120 and 160), metrics associated with established service meshes, etc. In some embodiments, one or more storage systems utilized to implement the service mesh database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the service mesh management platform 110, as well as to support communication between the service mesh management platform 110 and other related systems and devices not explicitly shown.

In some embodiments, the host computing devices 106 of the IT infrastructure 105 are owned or operated by the same enterprise that operates the service mesh management platform 110 (e.g., where an enterprise such as a business provides support for the assets it operates). In other embodiments, the host computing devices 106 of the IT infrastructure 105 may be owned or operated by one or more enterprises different than the enterprise which operates the service mesh management platform 110 (e.g., a first enterprise provides support for assets that are owned by multiple different customers, business, etc.). Various other examples are possible.

In some embodiments, the client devices 102 and the host computing devices 106 of the IT infrastructure 105 implement host agents that are configured for exchanging information with one another and possibly the service mesh management platform 110. It should be noted that a "host agent" as this term is generally used herein may comprise an automated entity, such as a software entity running on a processing device. Accordingly, a host agent need not be a human entity.

The client devices 102, the host computing devices 106 and the service mesh management platform 110 in the FIG. 1 embodiment are each assumed to be implemented using at least one processing device. Each such processing device generally comprises at least one processor and an associated memory, and implements one or more functional modules or logic for controlling certain features of the client devices 102, the host computing devices 106 and the service mesh management platform 110. In the FIG. 1 embodiment, the service mesh management platform 110 implements service mesh management logic 112 and optionally service mesh multiplexing logic 114, while the host computing devices 106-1, 106-2, . . . 106-N implement respective instances of physical-to-virtual service mesh generation logic 116-1, 116-2, . . . 116-N (collectively, physical-to-virtual service mesh generation logic 116) and optionally instances of the service mesh multiplexing logic 114. The service mesh management logic 112 is configured to manage the establishment of physical-to-virtual service meshes between one or more of the external devices 107 and one or more of the virtual computing instances 120 and 160. This may include, for example, utilizing one or more instances of the physical-to-virtual service mesh generation logic 116 to establish one or more physical-to-virtual service meshes between physical drivers running on one or more of the host computing devices 106 and virtual drivers running on one or more of the virtual computing instances 120 and 160. The service mesh multiplexing logic 114 is configured to coordinate among one or more of the physical-to-virtual service meshes established between one or more of the external devices 107 and one or more of the virtual computing instances 120 and 160. As shown in FIG. 1, the different instances of the service mesh multiplexing logic 114 are shown in dashed outline, as the service mesh multiplexing logic 114 may be implemented on any one of or combination of the host computing devices 106 and the service mesh management platform 110.

At least portions of the service mesh management logic 112, the service mesh multiplexing logic 114 and the physical-to-virtual service mesh generation logic 116 may be implemented at least in part in the form of software that is stored in memory and executed by a processor.

The service mesh management platform 110 and other portions of the information processing system 100, as will be described in further detail below, may be part of cloud infrastructure.

The service mesh management platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the IT infrastructure 105, the host computing devices 106, the external devices 107, the service mesh database 108, and the service mesh management platform 110 or components thereof (e.g., the service mesh management logic 112, the service mesh multiplexing logic 114 and the physical-to-virtual service mesh generation logic 116) may be implemented on respective distinct processing platforms, although numerous other arrangements are possible. For example, in some embodiments at least portions of the service mesh management platform 110 and one or more of the client devices 102, the IT infrastructure 105, the host computing devices 106 and/or the service mesh database 108 are implemented on the same processing platform. The client devices 102 can therefore be implemented at least in part within at least one processing platform that implements at least a portion of the service mesh management platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, the host computing devices 106, the external devices 107, the service mesh database 108 and the service mesh management platform 110, or portions or components thereof, to reside in different data centers. Numerous other distributed implementations are possible. The service mesh management platform 110 can also be implemented in a distributed manner across multiple data centers.

Additional examples of processing platforms utilized to implement the service mesh management platform 110 and other components of the information processing system 100 in illustrative embodiments will be described in more detail below in conjunction with FIGS. 9 and 10.

It is to be appreciated that these and other features of illustrative embodiments are presented by way of example only, and should not be construed as limiting in any way.

It is to be understood that the particular set of elements shown in FIG. 1 for establishment and management of service meshes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Exemplary processes for establishment and management of service meshes established between virtual computing instances and external devices connected to host devices will now be described in more detail with reference to the flow diagrams of FIGS. 2A and 2B. It is to be understood that these particular processes are only examples, and that additional or alternative processes for establishment and management of service meshes established between virtual computing instances and external devices connected to host devices may be used in other embodiments.

The FIG. 2A process includes steps 200 through 204. These steps are assumed to be performed by the host computing devices 106 and/or the service mesh management platform 110 utilizing one or more of the service mesh management logic 112, the service mesh multiplexing logic 114, and the physical-to-virtual service mesh generation logic 116. The FIG. 2A process begins with step 200, receiving a request, from an application running on a virtual computing instance, to consume data from an external device coupled to a physical hardware port of a host device. The external device has a first interface with a physical driver running on a host operating system of the host device, the first interface having a first interface type. In some embodiments, the host device comprises an edge gateway device and the external device comprises an IoT device. The external device may comprise a sensor device, a peripheral device, an industrial personal computer (PC) device, a server, etc. The virtual computing instance may run on the host device (e.g., to which the external device is connected) or another host device. The virtual computing instance may comprise a VM, a software container, a microservice, etc.

In step 202, a second interface is instantiated on the host operating system of the host device. The second interface has a second interface type. The second interface type is different than the first interface type. A service mesh for the application running on the virtual computing instance to consume data from the external device coupled to the physical hardware port of the host device is established in step 204 by linking the instantiated second interface with (i) a virtual driver running on the virtual computing instance and (ii) the physical driver running on the host operating system of the host device. The second interface may comprise a socket plane interface enabling Transport Control Protocol (TCP)/Internet Protocol (IP) communications between (i) the virtual driver running on the virtual computing instance and (ii) the physical driver running on the host operating system of the host device. The second interface may be associated with a first class type and the virtual driver may be associated with a second class type, the first class type and the second class type corresponding to a device type of the external device. The first interface type may comprise at least one of a serial interface, a General Purpose Input/Output (GPIO) interface, a sensor interface, a lab card interface, a video interface, and an audio interface, and the second interface type comprises a socket plane interface.

The FIG. 2B process includes steps 250 through 254. These steps are assumed to be performed by the host computing devices 106 and/or the service mesh management platform 110 utilizing one or more of the service mesh management logic 112, the service mesh multiplexing logic 114, and the physical-to-virtual service mesh generation logic 116. The FIG. 2B process begins with step 250, maintaining a register of interface endpoints for one or more external devices coupled to one or more physical hardware ports of one or more host devices and one or more virtual ports associated with one or more virtual devices running on one or more virtual computing instances. Step 250 may comprise automating onboarding and removal of interface endpoints in response to detection of coupling and decoupling of the one or more external devices to and from the one or more physical hardware ports of the one or more host devices.

In step 252, a given logical-to-physical mapping is generated in response to establishment of a given service mesh enabling a given application running on a given one of the one or more virtual computing instances to consume data from a given one of the one or more external devices coupled to a given one of the one or more physical hardware ports of a given one of the one or more host devices. The given logical-to-physical mapping is between (i) a given virtual identifier of a first interface endpoint in the register of interface endpoints associated with a given one of the one or more virtual ports associated with a given one of one or more virtual devices running on the given virtual computing instance and (ii) a given physical identifier of a second interface endpoint in the register of interface endpoints associated with the given external device coupled to the given physical hardware port of the given host device. The given host device may comprise an edge gateway device, and the given external device may comprise an IoT device. The given virtual computing instance may run on the given host device, or on another host device different than the given host device. The given virtual computing instance may comprise at least one of a VM, a software container, and a microservice. The given service mesh may comprise a socket plane interface instantiated on the given host device enabling TCP/IP communications between a given virtual driver running on the given virtual computing instance and a given physical driver running on the host operating system of the given host device. The socket plane interface may be distinct from a physical device interface utilized for communication between the given external device and the given physical driver. The physical device interface may comprise at least one of a serial interface, a GPIO interface, a sensor interface, a lab card interface, a video interface, and an audio interface.

The FIG. 2B process continues with step 254, controlling exchange of data for the given service mesh based at least in part on the given logical-to-physical mapping and one or more policies. Step 254 may comprise performing event-based queuing of commands exchanged between the given application and the given external device. Step 254 may also or alternatively comprise controlling at least one of timing and multiplexing of data exchanged between the given application and the given external device. Controlling said at least one of the timing and the multiplexing of the data that is exchanged between the given application and the given external device may comprise at least one of managing handshaking between the given application and the given external device, performing flow control for one or more data flows established between the given application and the given external device, management of start and stop bits for the one or more data flows, and interrupt handling for the one or more data flows. Step 254 may further or alternatively comprise monitoring bandwidth usage by the given service mesh, generating at least one metric based at least in part on the monitored bandwidth usage, and modifying one or more bandwidth constraints for the given service mesh based at least in part on the generated at least one metric. Step 254 may further or alternatively comprise performing device configuration for at least one of the given external device and the given virtual device running on the given virtual computing instance.

In an IoT or other IT infrastructure environment, usage of a variety of sensor devices is common. Each sensor device is typically connected to and associated with a single host computing device, where that host computing device must also host an application which consumes data from that sensor device. This represents a brittle and hard to work arrangement when trying to realize benefits from IoT and other IT infrastructure environment. Conventional approaches, such as EdgeXFoundry, provide an IoT framework which is inflexible for virtualization and does not abstract virtual devices. Further, such conventional approaches are based on protocol and not on virtual devices. Such conventional approaches rely on vendor neutrality and implementations designed around real hardware, which is challenging for virtualization, containerization and security posture. Further, such conventional approaches do not allow for horizontal scaling as they are designed and attached to real hardware.

Illustrative embodiments provide technical solutions for consuming data from sensor devices (e.g., IoT devices) in one or more service meshes, where the service meshes may operate across host computing devices. In order to allow automation between host computing devices, some embodiments further provide technical solutions for a service mesh multiplexer (muxer) service, which can route between physical and virtual devices using multiplexing (mux) logic. The service mesh muxer service also provides functionality for a metrics service and a discovery broker.

The value of edge computing, and the consumption of data from sensor devices such as IoT devices, is on the rise. Sensor implementations, however, may vary between different frameworks and between different vendors. A unified way of addressing sensor devices is crucial to provide a common framework for interacting with mainly legacy sensor device interfaces which are inherently connected to specific physical host devices. In modern IT infrastructure environments, such as virtualized computing environments, containerized computing environments, microservice computing environments, etc., the technical solutions described herein can advantageously provide a unified interface to the resources of sensor devices, provide a way to span the resources of the sensor devices across enterprises, provide a means of interfacing with legacy applications towards these interfaces in modern environments, provide a way of abstracting physical sensor devices in virtualized computing environments, etc. In some cases, a significant portion of data (e.g., 75% or more) may be generated outside of a datacenter (e.g., on sensor or other IoT devices). Further, legacy ports are the foundations for moving from the so-called fourth Industrial Revolution (Industry 4.0) to the fifth Industrial Revolution (Industry 5.0). Further, many Industrial IoT (IIoT) installations (e.g., 80-90%) are considered "Brownfield" (e.g., installed and configured on hardware or software which coexists with legacy IT systems).

Historically, there is a huge diversity in frameworks which brings huge challenges in unity towards a common layer of interaction across an edge computing estate. There is a need for a means of providing an interactive way of accessing these legacy resources over a modern distributed, virtualized and containerized infrastructure which is typical at the edge and IoT landscape. For example, a serial interface may use RS-232, RS-485 and RS-422 ports, which are mapped to /dev/ttyx or /dev/ttyUSBx devices in virtual computing environments. A general purpose input/output (GPIO) interface may use digital input-output (DIO), digital to analog (DAC) and/or analog to digital (ADC) port types, which are mapped to SYSFS/GPIO or /dev/gpiochipx devices in virtual computing environments. Sensors such as humidity, temperature, accelerometer, etc. have interfaces which may be mapped using Industrial I/O (IIO) port types which are mapped to SYSFS/IIO in virtual computing environments. Controller Area Network (CAN) interfaces (e.g., Can4Linux, Devicenet, CANopen) may map to socket port types which are mapped to/dev/canx or /dev/ethx devices in virtual computing environments. Audio interfaces may utilize Advanced Linux Sound Architecture (ALSA) port types such as Alsa, Pulse, etc., and map to/dev/dspx devices in virtual computing environments. Camera interfaces may utilize Video4Linux version 2 (V4L2) port types and map to /dev/videox devices in virtual computing environments. Inter-Integrated Circuit (I2C) interfaces may be mapped to Linux SYSFS pseudo file systems and can be used as transport for sensor and GPIO interfaces, and are mapped to /sys/bus/I2C/devices/I2C-x/ devices in virtual computing environments. Global Positioning System (GPS) interfaces may use a serial from GPSD port type and map to/dev/ttyUSBx or/dev/ttyx devices in virtual computing environments. The Linux Control and Measurement Device Interface (e.g., comedi) may be used for high speed labcard ports which are mapped to/dev/comedix_subdx devices in virtual computing environments. Various other types of interfaces, such as Bluetooth and display interfaces, may similarly have associated port types and device mappings in virtual computing environments.

The technical solutions described herein, in some embodiments, address the diversity in port types and drivers to address various technical problems and challenges by implementing a proxy and stub between each driver endpoint separating the physical device driver from the functional application programming interface (API) end. This will provide the functionality for overcoming technical challenges associated with the diversity of drivers. Each entity will use two new to-be-created components which allow for Transmission Control Protocol (TCP)/Internet Protocol (IP) connectivity between them. These components include a "Net2Dev" component in a virtual computing environment, and a "Dev2Net" component in the real, physical computing environment. The Net2Dev component may be embodied as or within a virtual driver within a virtual computing instance (e.g., a VM, a container, a microservice, etc.), while the Dev2Net component may be embodied as or within a physical driver providing a physical device interface on a host operating system (OS) running on top of a physical computing device to which an external device is attached.

Figure 3:
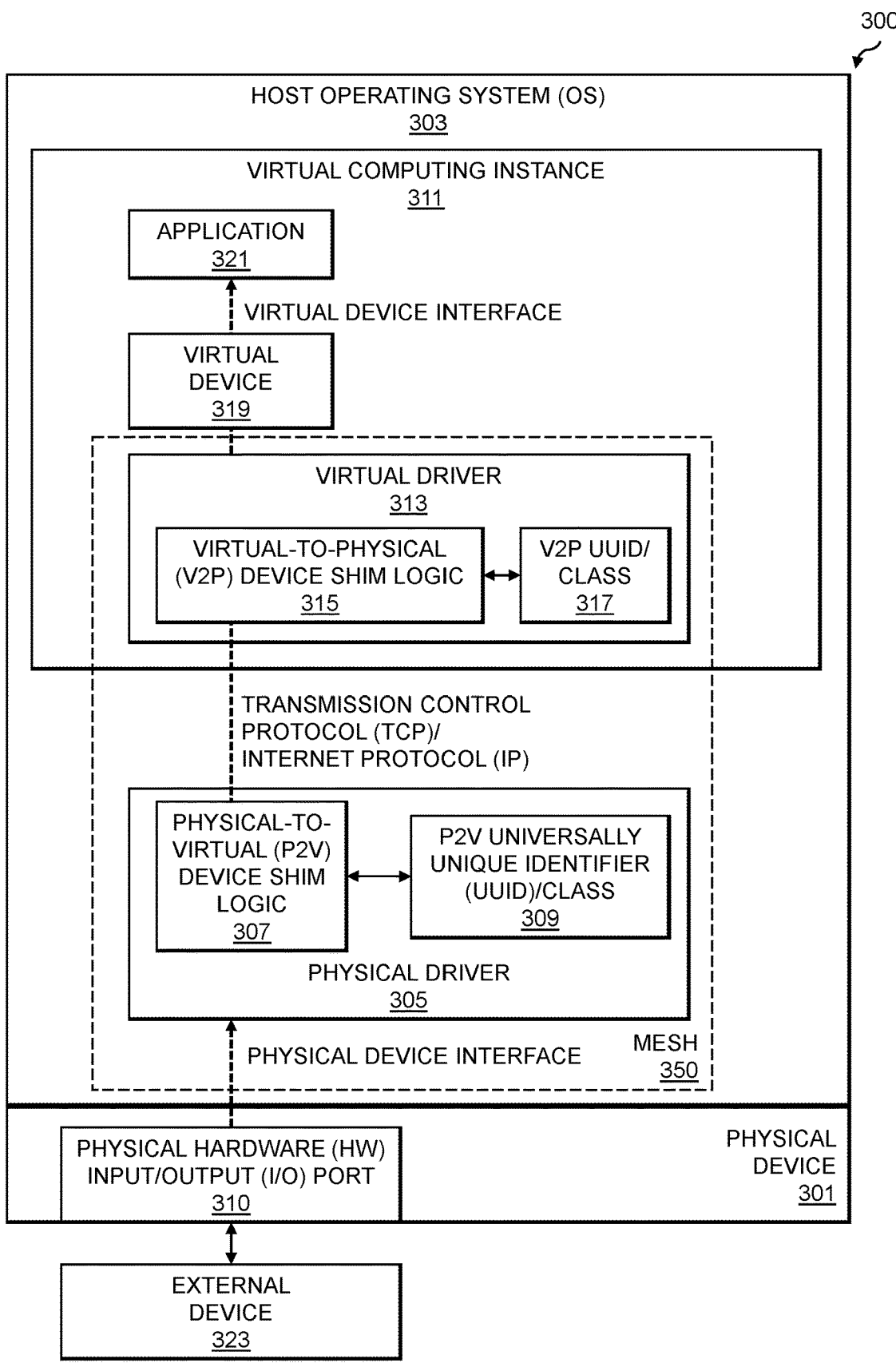
FIG. 3 shows a computing device implementing a service mesh for mapping an external device connected to the computing device to a virtual computing instance implemented on the computing device in an illustrative embodiment.

FIG. 3 shows a system 300 including a physical computing device 301 on which a host OS 303 runs. A service mesh 350 is implemented for mapping an external device 323 which is connected to a physical hardware (HW) I/O port 310 of the physical computing device 301. The external device 323 may comprise various sensors (e.g., IoT devices), peripherals (e.g., cameras, microphones, etc.) or other device types which are connected to the physical HW I/O port 310. The physical HW I/O port 310 may comprise, for example, a GPIO port, a sensor suite, a Universal Serial Bus (USB) port, a serial port, etc.

The host OS 303 comprises a physical driver 305 (e.g., /dev/ttyS0) for the external device 323 connected to the physical HW I/O port 310. The physical driver 305 exposes a physical device interface for the external device 323. The physical driver 305 further implements physical-to-virtual (P2V) device shim logic 307, which is associated with a P2V universally unique identifier (UUID) and class 309 (P2V UUID/class 309). The term "shim" refers to software code that acts as a bridge between different components or layers of a computing system. The P2V device shim logic 307 (e.g., which provides a Dev2Net component) intercepts physical device interface calls from the external device 323 and converts them for communication over a TCP/IP connection to a virtual driver 313 running on a virtual computing instance 311. The P2V device shim logic 307 also intercepts calls directed to the external device 323 which are received over the TCP/IP connection from the virtual driver 313, and converts them to physical device interface calls to the external device 323 via the physical HW I/O port 310.

The virtual driver 313 runs on the virtual computing instance 311 (e.g., a VM, a container, a microservice, etc.), and implements virtual-to-physical (V2P) device shim logic 315, which is associated with a V2P UUID and class 317

(V2P UUID/class 317). The virtual driver 313 is associated with a virtual device 319 (e.g., dev/ttySx) on the virtual computing instance 311. An application 321 (e.g., Litmus) running on the virtual computing instance 311 consumes data from the virtual device 319 via a virtual device interface, as if the virtual device 319 were the actual external device 323. To do so, the V2P device shim logic 315 will intercept the virtual device interface calls and convert them for communication over the TCP/IP connection to the physical driver 305. As noted above, the P2V device shim logic 307 on the physical driver 305 may convert such communications to physical device interface calls provided to the external device 323 via the physical HW I/O port 310. The service mesh 350 enables virtual to physical communication between the application 321 running on the virtual computing instance 311 and the external device 323. In some embodiments, the P2V device shim logic 307 and the V2P device shim logic 315 implement a socket plane interface for enabling the TCP/IP communications between the virtual driver 313 and the physical driver 305.

The P2V UUID/class 309 and the V2P UUID/class 317 allow for differentiating different device types and their associated libraries, and also enable class and device port mapping (DevPortMapping). Each entity has a V2P UUID and class, as well as a P2V UUID and class. FIG. 4 shows a class to device port mapping table 400, showing various external device types, their associated classes, and their associated device port mappings. In FIG. 3, the external device 323 may comprise a serial device which has the LibSerial class and is mapped to a/dev/ttySx virtual serial device (e.g., virtual device 319) on the virtual computing instance 311. In this example, the physical device interface (e.g., between the physical driver 305 and the external device 323) and the virtual device interface (e.g., between the virtual device 319 and the application 321) comprise respective serial interfaces. If the external device 323 is a different type, then the physical and virtual device interfaces may also be different interface types.

Figure 5:
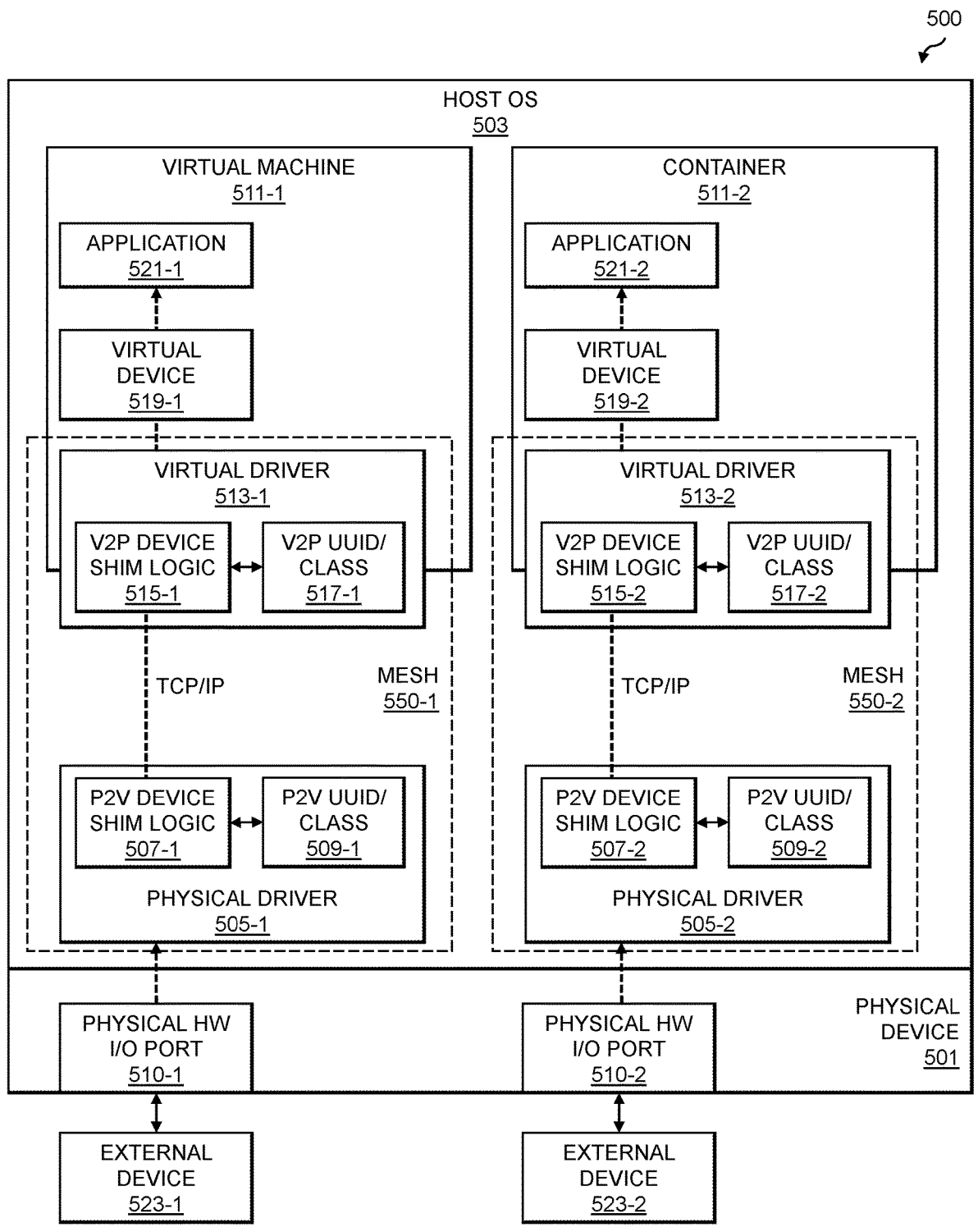
FIG. 5 shows a computing device implementing a service mesh for mapping multiple external devices connected to the computing device to multiple different virtual computing instances implemented on the computing device in an illustrative embodiment.

FIG. 5 shows a system 500 including a physical computing device 501 on which a host OS 503 runs. Service meshes 550-1 and 550-2 (collectively, service meshes 550) are implemented for mapping multiple external devices 523-1 and 523-2 (collectively, external devices 523) which are connected to respective physical HW I/O ports 510-1 and 510-2 (collectively, physical HW I/O ports 510) of the physical computing device 501. The external devices 523 may comprise various sensors (e.g., IoT devices), peripherals (e.g., cameras, microphones, etc.) or other devices which are connected to the physical HW I/O ports 510. The physical HW I/O ports 510 may comprise, for example, GPIO ports, sensor suites, USB ports, serial ports, etc.

The host OS 503 comprises physical drivers 505-1 and 505-2 (collectively, physical drivers 505) for the external devices 523-1 and 523-2 connected to the physical HW I/O ports 510-1 and 510-2. The physical drivers 505-1 and 505-2 further implement respective instances of P2V device shim logic 507-1 and 507-2 (collectively, P2V device shim logic 507), which are associated with respective P2V UUIDs and classes 509-1 and 509-2 (collectively, P2V UUIDs/classes 509). The P2V device shim logic 507 (e.g., which provide Dev2Net components) intercepts physical device interface calls from the external devices 523 and converts them for communication over a TCP/IP connection to virtual drivers 513-1 and 513-2 (collectively, virtual drivers 513) running on virtual computing instances which, in the FIG. 5 embodiment, include a VM 511-1 and a container 511-2. It should be appreciated, however, that both of the virtual computing instances may be VMs, both may be containers, one or both may comprise microservices, etc. The P2V device shim logic 507 also intercepts calls directed to the external devices 523 which are received over the TCP/IP connection from the virtual drivers 513, and converts them to physical device interface calls to the external devices 523 via the physical HW I/O ports 510.

The virtual drivers 513 run on the VM 511-1 and container 511-2, and implement respective instances of V2P device shim logic 515-1 and 515-2 (collectively, V2P device shim logic 515), which are associated with respective V2P UUIDs and classes 517-1 and 517-2 (collectively, V2P UUIDs/classes 517). The virtual drivers 513-1 and 513-2 are associated with respective virtual devices 519-1 and 519-2 (collectively, virtual devices 519) on the VM 511-1 and the container 511-2. Applications 521-1 and 521-2 (collectively, applications 521) running on the VM 511-1 and the container 511-2 consume data from the virtual devices 519 via virtual device interfaces, as if the virtual devices 519 were the actual external devices 523. To do so, the V2P device shim logic 515 will intercept the virtual device interface calls and convert them for communication over the TCP/IP connection to the physical drivers 505. As noted above, the P2V device shim logic 507 on the physical drivers 505 may convert such communications to physical device interface calls provided to the external devices 523 via the physical HW I/O ports 510. The service mesh 550-1 enables virtual to physical communication between the application 521-1 running on the VM 511-1 and the external device 523-1, while the service mesh 550-2 enables virtual to physical communication between the application 521-2 running on the container 511-2 and the external device 523-2. It should be noted that while FIG. 5 shows an example where two different applications 521-1 and 521-2 consume data from different external devices 523-1 and 523-2, this is not a requirement. In some embodiments, a single application may consume data from multiple different external devices, or a single external device may provide data to multiple different applications running on the same or different virtual computing instances on the same or different hosts. In some embodiments, the P2V device shim logic 507 and the V2P device shim logic 515 implement socket plane interfaces for enabling the TCP/IP communications between the virtual drivers 513 and the physical drivers 505.

Figure 6:
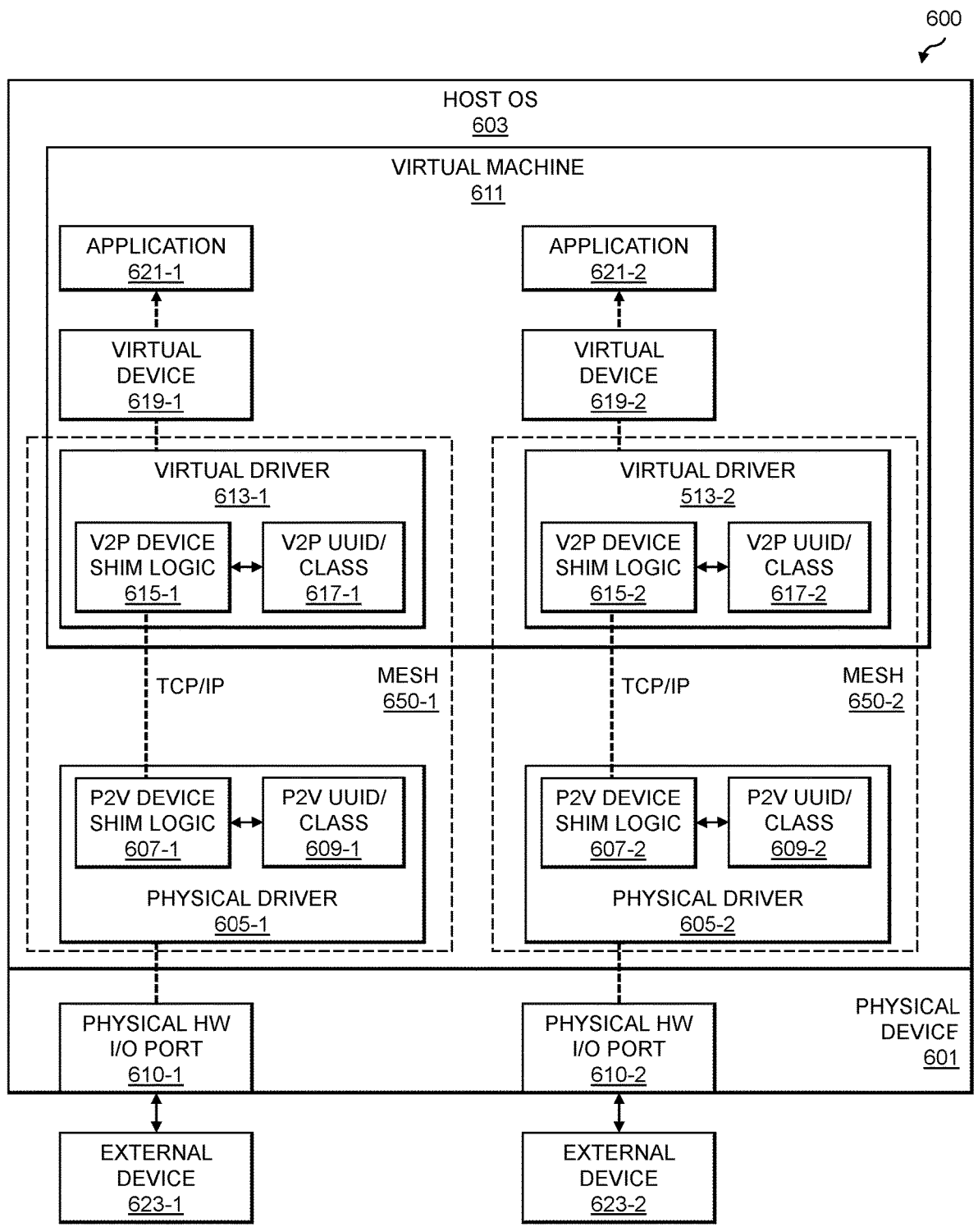
FIG. 6 shows a computing device implementing a service mesh for mapping multiple external devices connected to the computing device to a single virtual computing instance implemented on the computing device in an illustrative embodiment.

While the system 500 of FIG. 5 shows an example where multiple service meshes 550 are used for mapping external devices 523 to different virtual computing instances (e.g., the VM 511-1 and the container 511-2), this is not a requirement. Multiple service meshes may be used to map multiple external devices to a same virtual computing instance. FIG. 6 shows an example of such an arrangement.

FIG. 6 shows a system 600 including a physical computing device 601 on which a host OS 603 runs. Service meshes 650-1 and 650-2 (collectively, service meshes 650) are implemented for mapping multiple external devices 623-1 and 623-2 (collectively, external devices 623) which are connected to respective physical HW I/O ports 610-1 and 610-2 (collectively, physical HW I/O ports 610) of the physical computing device 601. The external devices 623 may comprise various sensors (e.g., IoT devices), peripherals (e.g., cameras, microphones, etc.) or other devices which are connected to the physical HW I/O ports 610. The physical HW I/O ports 610 may comprise, for example, GPIO ports, sensor suites, USB ports, serial ports, etc.

The host OS 603 comprises physical drivers 605-1 and 605-2 (collectively, physical drivers 605) for the external devices 623-1 and 623-2 connected to the physical HW I/O ports 610-1 and 610-2. The physical drivers 605-1 and 605-2 further implement respective instances of P2V device shim logic 607-1 and 607-2 (collectively, P2V device shim logic 607), which are associated with respective P2V UUIDs and classes 609-1 and 609-2 (collectively, P2V UUIDs/classes 609). The P2V device shim logic 607 (e.g., which provide Dev2Net components) intercepts physical device interface calls from the external devices 623 and converts them for communication over a TCP/IP connection to virtual drivers 613-1 and 613-2 (collectively, virtual drivers 613) running on a same virtual computing instance which, in the FIG. 6 embodiment, is a VM 611. It should be appreciated, however, that the virtual computing instances may be a container, a microservice, etc. The P2V device shim logic 607 also intercepts calls directed to the external devices 623 which are received over the TCP/IP connections from the virtual drivers 613, and converts them to physical device interface calls to the external devices 623 via the physical HW I/O ports 610.

The virtual drivers 613 run on the VM 611, and implement respective instances of V2P device shim logic 615-1 and 615-2 (collectively, V2P device shim logic 615), which are associated with respective V2P UUIDs and classes 617-1 and 617-2 (collectively, V2P UUIDs/classes 617). The virtual drivers 613-1 and 613-2 are associated with respective virtual devices 619-1 and 619-2 (collectively, virtual devices 619) on the VM 611. Applications 621-1 and 621-2 (collectively, applications 621) running on the VM 611 consume data from the virtual devices 619 via virtual device interfaces, as if the virtual devices 619 were the actual external devices 623. To do so, the V2P device shim logic 615 will intercept the virtual device interface calls and convert them for communication over the TCP/IP connections to the physical drivers 605. As noted above, the P2V device shim logic 607 on the physical drivers 605 may convert such communications to physical device interface calls provided to the external devices 623 via the physical HW I/O ports 610. The service mesh 650-1 enables virtual to physical communication between the application 621-1 running on the VM 611 and the external device 623-1, while the service mesh 650-2 enables virtual to physical communication between the application 621-2 running on the VM 611 and the external device 623-2. It should be noted that while FIG. 6 shows an example where two different applications 621-1 and 621-2 running on the VM 611 consume data from different external devices 623-1 and 623-2, this is not a requirement. In some embodiments, a single application may consume data from multiple different external devices, or a single external device may provide data to multiple different applications running on the same or different virtual computing instances on the same or different hosts. In some embodiments, the P2V device shim logic 607 and the V2P device shim logic 615 implement socket plane interfaces for enabling the TCP/IP communications between the virtual drivers 613 and the physical drivers 605.

Figure 7:
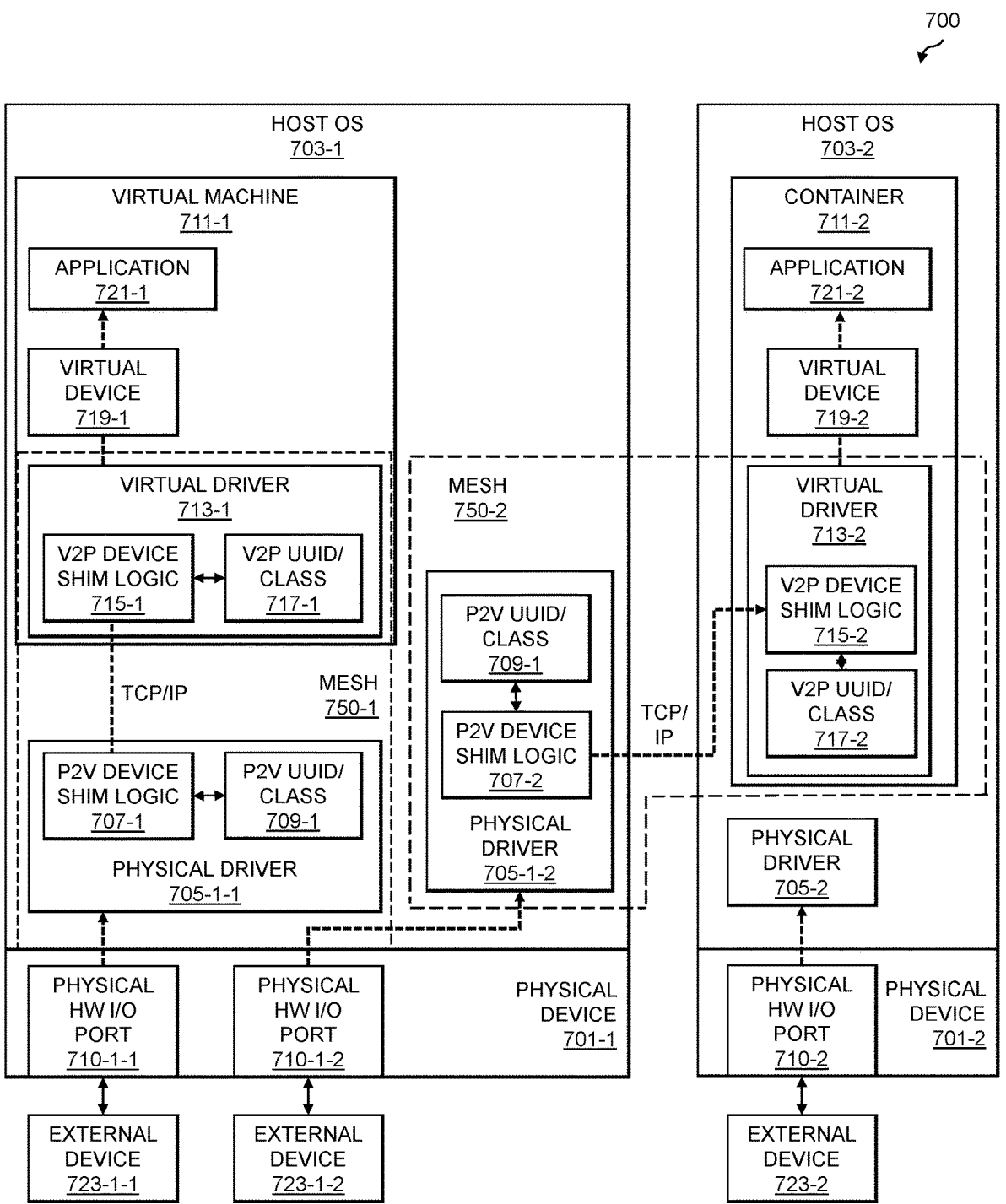
FIG. 7 shows a computing device implementing a first service mesh between a first external device connected to a first computing device and a first virtual computing instance implemented on the first computing device and a second service mesh between a second external device connected to the first computing device and a second virtual computing instance implemented on a second computing device in an illustrative embodiment.

While in the FIGS. 3, 5 and 6 examples each of the service meshes 350, 550 and 650 are on a same host (e.g., the same physical computing devices 301, 501 and 601), this is not a requirement. A service mesh may span between hosts, such that an external device connected to a physical HW I/O port on one host may be connected to a virtual computing instance running another host. For example, a first external device connected to a first physical HW I/O port on a first host may be mapped to a first virtual computing instance running on the first host, while a second external device connected to a second physical HW I/O port on the first host may be mapped to a second virtual computing instance running on a second host. FIG. 7 shows an example of such an arrangement.

FIG. 7 shows a system 700 including physical computing devices 701-1 and 701-2 (collectively, physical computing devices 701) on which host OSes 703-1 and 703-2 (collectively, host OSes 703) run. The physical computing device 701-1 includes physical HW I/O ports 710-1-1 and 710-1-2 (collectively, physical HW I/O ports 710-1) to which external devices 723-1-1 and 723-1-2 (collectively, external devices 723-1) are connected. The physical computing device 701-2 includes physical HW I/O port 710-2 to which external device 723-2 is connected. The host OS 703-1 runs physical drivers 705-1-1 and 705-1-2 (collectively, physical drivers 705-1) for the external devices 723-1-1 and 723-1-2 connected to the physical HW I/O ports 710-1-1 and 710-1-2. The host OS 703-2 runs physical driver 705-2 for the external device 723-2 connected to the physical HW I/O port 710-2. The external devices 723-1 and 723-2 (collectively, external devices 723) may comprise various sensors (e.g., IoT devices), peripherals (e.g., cameras, microphones, etc.) or other devices which are connected to the physical HW I/O ports 710-1 and 710-2 (collectively, physical HW I/O ports 710). The physical HW I/O ports 710 may comprise, for example, GPIO ports, sensor suites, USB ports, serial ports, etc.

The physical drivers 705-1-1 and 705-1-2 implement respective instances of P2V device shim logic 707-1 and 707-2 (collectively, P2V device shim logic 707), which are associated with respective P2V UUIDs and classes 709-1 and 709-2 (collectively, P2V UUIDs/classes 709). The P2V device shim logic 707 (e.g., which provides Dev2Net components) intercepts physical device interface calls from the external devices 723-1 and converts them for communication over a TCP/IP connection to virtual drivers 713-1 and 713-2 (collectively, virtual drivers 713) running on different virtual computing instances which, in the FIG. 7 example, include VM 711-1 running on the host OS 703-1 of the physical computing device 701-1 and the container 711-2 running on the host OS 703-2 of the physical computing device 701-2. While in the FIG. 7 example, the virtual computing instances include VM 711-1 and container 711-2, this is not a requirement. Both of the virtual computing instances may be VMs, both may be containers, one or both may be or include microservices, etc. The P2V device shim logic 707 also intercepts calls directed to the external devices 723-1 which are received over the TCP/IP connections from the virtual drivers 713, and converts them to physical device interface calls to the external devices 723-1 via the physical HW I/O ports 710-1.

The virtual drivers 713-1 and 713-2 run on the VM 711-1 and the container 711-2, respectively, and implement respective instances of V2P device shim logic 715-1 and 715-2 (collectively, V2P device shim logic 715), which are associated with respective V2P UUIDs and classes 717-1 and 717-2 (collectively, V2P UUIDs/classes 717). The virtual drivers 713-1 and 713-2 are associated with respective virtual devices 719-1 and 719-2 (collectively, virtual devices 719) on the VM 711-1 and the container 711-2. Applications 721-1 and 721-2 (collectively, applications 721) running on the VM 711-1 and the container 711-2 consume data from the virtual devices 719-1 and 719-2 via virtual device interfaces, as if the virtual devices 719-1 and 719-2 were the actual external devices 723-1. To do so, the V2P device shim logic 715 will intercept the virtual device interface calls and convert them for communication over the TCP/IP connections to the physical drivers 705-1. As noted above, the P2V device shim logic 707 on the physical drivers 705-1 may convert such communications to physical device interface calls provided to the external devices 723-1 via the physical HW I/O ports 710-1. The service mesh 750-1 enables virtual to physical communication between the application 721-1 running on the VM 711-1 and the external device 723-1-1, while the service mesh 750-2 enables virtual to physical communication between the application 721-2 running on the container 711-2 and the external device 723-1-2. It should be noted that while FIG. 7 shows an example where two different applications 721-1 and 721-2 consume data from different external devices 723-1-1 and 723-1-2, this is not a requirement. In some embodiments, a single application may consume data from multiple different external devices, or a single external device may provide data to multiple different applications running on the same or different virtual computing instances on the same or different hosts. In some embodiments, the P2V device shim logic 707 and the V2P device shim logic 715 implement socket plane interfaces for enabling the TCP/IP communications between the virtual drivers 713 and the physical drivers 705-1.

It should be noted that FIGS. 3 and 5-7 show different non-limiting examples of service meshes 350, 550, 650 and 750 which may be implemented using the technical solutions described herein. The technical solutions enable any number of service meshes to be implemented on any number of host devices, between any desired number of external devices and virtual computing instances running on the host devices, including where one or more virtual computing instances are associated with multiple service meshes, and where each service mesh may span one or multiple host devices. For example, a first host device may have one or multiple service meshes associated with each of one or more virtual computing instances, where the one or more virtual computing instances may run on the first host device and/or one or more additional host devices.

Figure 8A:
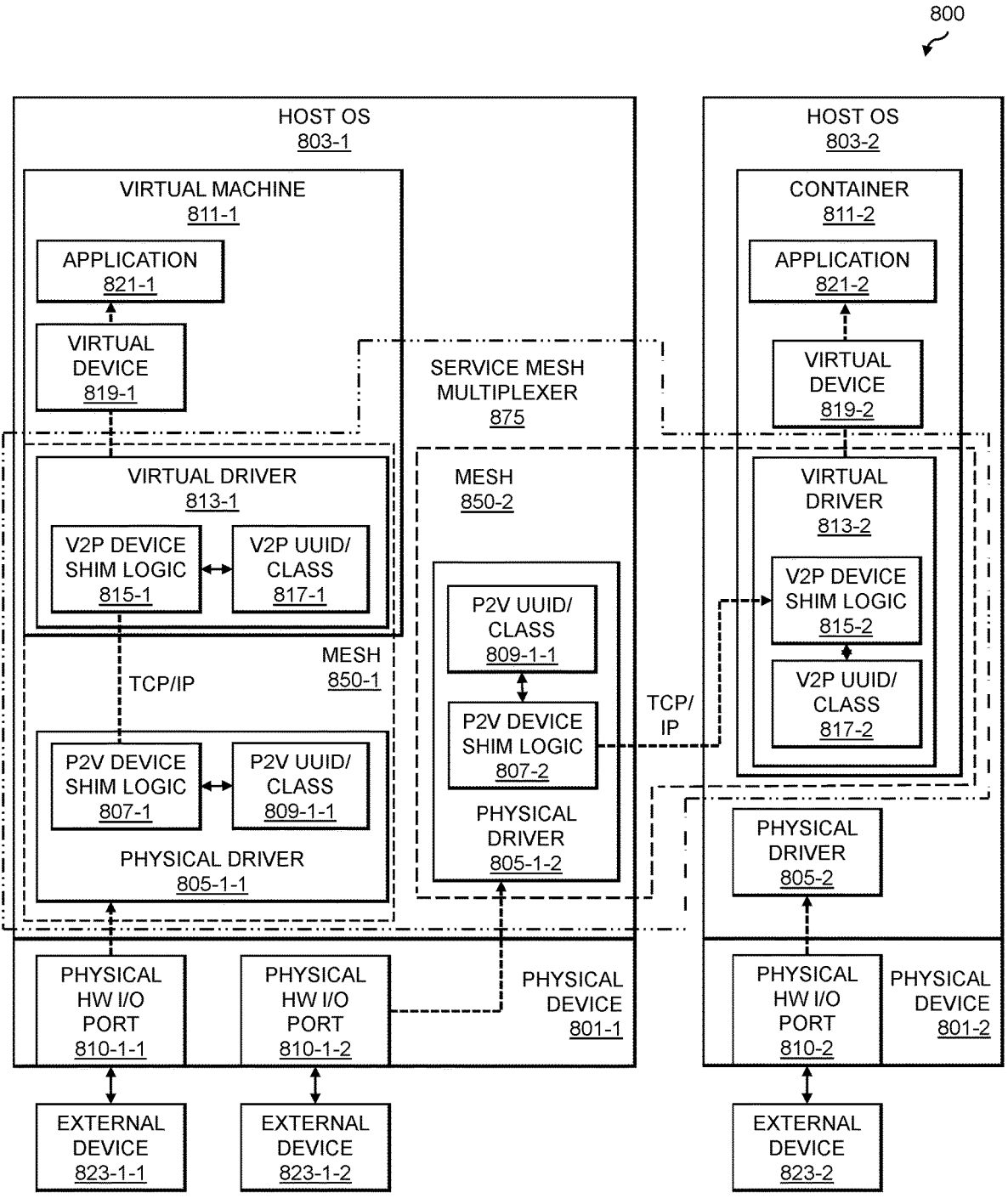
FIGS. 8A and 8B shows a service mush multiplexer for a first service mesh between a first external device connected to a first computing device and a first virtual computing instance implemented on the first computing device and a second service mesh between a second external device connected to the first computing device and a second virtual computing instance implemented on a second computing device in an illustrative embodiment.
Figure 8B:
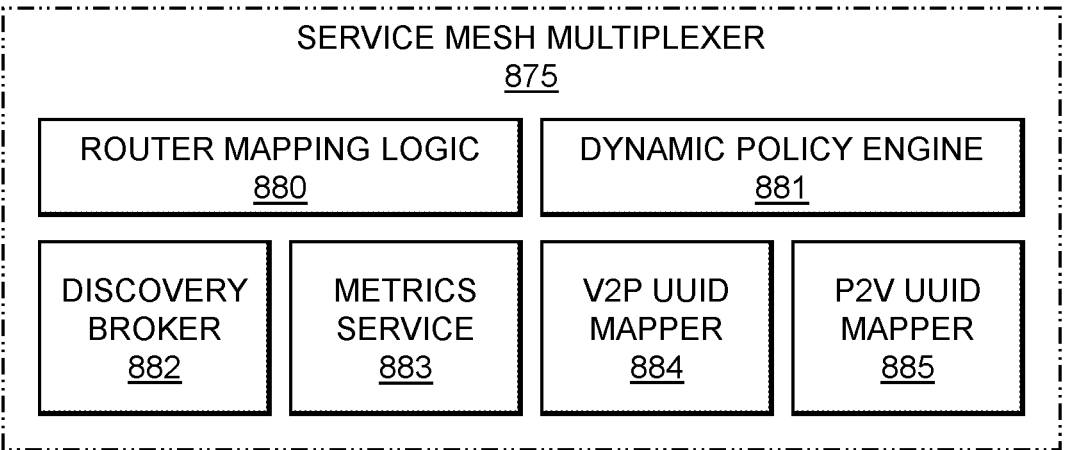

To administrate among or across host devices in the layer 2 network (e.g., the data link layer of the Open Systems Interconnection (OSI) model), the technical solutions described herein provide a service mesh multiplexer providing various services and functionality. Such services and functionality include, for example, services or functionality for automating physical to virtual mapping, for creating virtual IoT devices meshes over network logic, etc. FIGS. 8A and 8B show a system 800 which implements a service mesh multiplexer 875 for multiple service meshes 850-1 and 850-2 (collectively, service meshes 850).

As shown in FIG. 8A, the system 800 includes physical computing devices 801-1 and 801-2 (collectively, physical computing devices 801) on which host OSes 803-1 and 803-2 (collectively, host OSes 803) run. The physical computing device 801-1 includes physical HW I/O ports 810-1-1 and 810-1-2 (collectively, physical HW I/O ports 810-1) to which external devices 823-1-1 and 823-1-2 (collectively, external devices 823-1) are connected. The physical computing device 801-2 includes physical HW I/O port 810-2 to which external device 823-2 is connected. The host OS 803-1 runs physical drivers 805-1-1 and 805-1-2 (collectively, physical drivers 805-1) for the external devices 823-1-1 and 823-1-2 connected to the physical HW I/O ports 810-1-1 and 810-1-2. The host OS 803-2 runs physical driver 805-2 for the external device 823-2 connected to the physical HW I/O port 810-2. The external devices 823-1 and 823-2 (collectively, external devices 823) may comprise various sensors (e.g., IoT devices), peripherals (e.g., cameras, microphones, etc.) or other devices which are connected to the physical HW I/O ports 810-1 and 810-2

(collectively, physical HW I/O ports 810). The physical HW I/O ports 810 may comprise, for example, GPIO ports, sensor suites, USB ports, serial ports, etc.

The physical drivers 805-1-1 and 805-1-2 implement respective instances of P2V device shim logic 807-1 and 807-2 (collectively, P2V device shim logic 807), which are associated with respective P2V UUIDs and classes 809-1 and 809-2 (collectively, P2V UUIDs/classes 809). The P2V device shim logic 807 (e.g., which provide Dev2Net components) intercepts physical device interface calls from the external devices 823-1 and converts them for communication over a TCP/IP connection to virtual drivers 813-1 and 813-2 (collectively, virtual drivers 813) running on different virtual computing instances which, in the FIG. 8 example, include VM 811-1 running on the host OS 803-1 of the physical computing device 801-1 and the container 811-2 running on the host OS 803-2 of the physical computing device 801-2. While in the FIG. 8 example, the virtual computing instances include VM 811-1 and container 811-2, this is not a requirement. Both of the virtual computing instances may be VMs, both may be containers, one or both may be or include microservices, etc. The P2V device shim logic 807 also intercepts calls directed to the external devices 823-1 which are received over the TCP/IP connections from the virtual drivers 813, and converts them to physical device interface calls to the external devices 823-1 via the physical HW I/O ports 810-1.

The virtual drivers 813-1 and 813-2 run on the VM 811-1 and the container 811-2, respectively, and implement respective instances of V2P device shim logic 815-1 and 815-2 (collectively, V2P device shim logic 815), which are associated with respective V2P UUIDs and classes 817-1 and 817-2 (collectively, V2P UUIDs/classes 817). The virtual drivers 813-1 and 813-2 are associated with respective virtual devices 819-1 and 819-2 (collectively, virtual devices 819) on the VM 811-1 and the container 811-2. Applications 821-1 and 821-2 (collectively, applications 821) running on the VM 811-1 and the container 811-2 consume data from the virtual devices 819-1 and 819-2 via virtual device interfaces, as if the virtual devices 819-1 and 819-2 were the actual external devices 823-1. To do so, the V2P device shim logic 815 will intercept the virtual device interface calls and convert them for communication over the TCP/IP connections to the physical drivers 805-1. As noted above, the P2V device shim logic 807 on the physical drivers 805-1 may convert such communications to physical device interface calls provided to the external devices 823-1 via the physical HW I/O ports 810-1. The service mesh 850-1 enables virtual to physical communication between the application 821-1 running on the VM 811-1 and the external device 823-1-1, while the service mesh 850-2 enables virtual to physical communication between the application 821-2 running on the container 811-2 and the external device 823-1-2. It should be noted that while FIG. 8A shows an example where two different applications 821-1 and 821-2 consume data from different external devices 823-1-1 and 823-1-2, this is not a requirement. In some embodiments, a single application may consume data from multiple different external devices, or a single external device may provide data to multiple different applications running on the same or different virtual computing instances on the same or different hosts. In some embodiments, the P2V device shim logic 807 and the V2P device shim logic 815 implement socket plane interfaces for enabling the TCP/IP communications between the virtual drivers 813 and the physical drivers 805-1.

The service mesh multiplexer 875 coordinates the service meshes 850. As shown in FIG. 8B, the service mesh multiplexer 875 implements router mapping logic 880, dynamic policy engine 881, a discovery broker 882, a metrics service 883, a V2P UUID mapper 884, and a P2V UUID mapper 885. The router mapping logic 880 enables the administration of event-based queuing of commands in the muxing logic. The router mapping logic 880 further provides logical to physical mapping for V2P UUIDs and P2V UUIDs utilizing the V2P UUID mapper 884 and the P2V UUID mapper 885. The V2P UUID mapper 884 will administrate the mapping of V2P UUIDs of virtual ports inside virtual computing instances (e.g., VMs, containers, microservices, etc.). The P2V UUID mapper 885 will administrate the mapping of P2V UUIDs of physical ports (e.g., physical HW I/O ports 810) in the physical environment.

The dynamic policy engine 881 is configured to enable automation of the onboarding and creation of new devices in the service mesh multiplexer 875. The dynamic policy engine 881 provides an automated policy manager which helps administrate new devices. This policy manager governs read/write access on a per-interface basis.

In order to have the timing and multiplexing done correctly between sending and receiving data from a device interface, the service mesh multiplexer 875 is configured to allow device configuration. Such device configuration may include, but is not limited to, handshaking, flow control, start/stop bits, interrupt handling, and various other features that are required and need to be mapped in the service mesh multiplexer 875.

The discovery broker 882 is configured to work alongside the dynamic policy engine 881 and the router mapping logic 880, to assist in onboarding and offboarding (retiring) devices in the service meshes 850. The discovery broker 882 also provides a register of interface endpoints which are used by virtual device implementations.

The metrics service 883 is configured to monitor and determine various metrics for statistics and debugging purposes. The determined metrics may be used to assure bandwidth and other constraints are met, and enable dynamic scaling up and down as needed.

Various use cases will now be described with respect to the system 800 of FIG. 8, though it should be appreciated that such uses cases may also be implemented utilizing any of the systems 300, 500, 600 and 700 of FIGS. 3 and 5-7. In the first through third use cases, it is assumed that the physical computing device 801-1 comprises an edge gateway while the physical computing device 801-2 includes a remote laptop. A first use case includes remote GPS monitoring, where the external device 823-1-2 comprises a GPS device. By mapping the physical GPS device to the virtual computing instance (e.g., the container 811-2) on the physical computing device 801-2, the physical GPS device can be utilized over a network connection from the remote laptop. A second use case includes remote video recording, where the external device 823-1-2 comprises a video camera. By mapping the video camera to the virtual computing instance (e.g., the container 811-2) on the physical computing device 801-2, a video feed from the video camera can be viewed over a network connection from the remote laptop, such as where the application 821-2 comprises a video player which displays a video stream from the remote video camera (e.g., a Mobile Industry Processor Interface (MIPI) camera) attached to the edge gateway. A third use case includes remote audio recording, where the external device 823-1-2 comprises a microphone (e.g., in an urban environment). By mapping the microphone to the virtual computing instance (e.g., the container 811-2) on the physical computing device

801-2, an audio feed may be listened to and recorded remotely in a data center (e.g., to allow violence detection).

A fourth use case includes high speed DAC data acquisition and conversion, where the physical computing device 801-1 is an industrial PC (IPC) located inside a safety critical environment within an industrial site, and the external device 823-1-2 may comprise one or more sensors within the safety critical environment. The physical computing device 801-2 may comprise a Supervisory Control and Data Acquisition (SCADA) Human-Machine Interface (HMI) system. By mapping the sensors connected to the IPC in the safety critical environment to the virtual computing instance (e.g., the container 811-2) on the SCADA HMI system, the SCADA HMI system can read high speed acquisition data from the IPC located in the safety critical environment.

Various other use cases are possible, including Remote Data Acquisition Computer (RDAC) use cases, remote motion over Time Sensitive Networking (TSN) use cases, distributed OPC Unified Architecture (OPC-UA) use cases, digital twin and unplanned maintenance use cases, etc.

The technical solutions described herein provide a software-defined unified and automated way of communication between, for example, sensors or other IoT devices and virtual computing instances (e.g., VMs, containers, microservices, etc.) running on the same or different hosts to which the sensors or other IoT devices are connected. Thus, the technical solutions are able to separate physical and virtual functions, which allows safety critical separation. The technical solutions also provide a way for achieving high availability for and between legacy devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for establishment and management of service meshes established between virtual computing instances and external devices connected to host devices will now be described in greater detail with reference to FIGS. 9 and 10. Although described in the context of system 100, these platforms may also be used to implement at least portions of other information processing systems in other embodiments.

Figure 9:
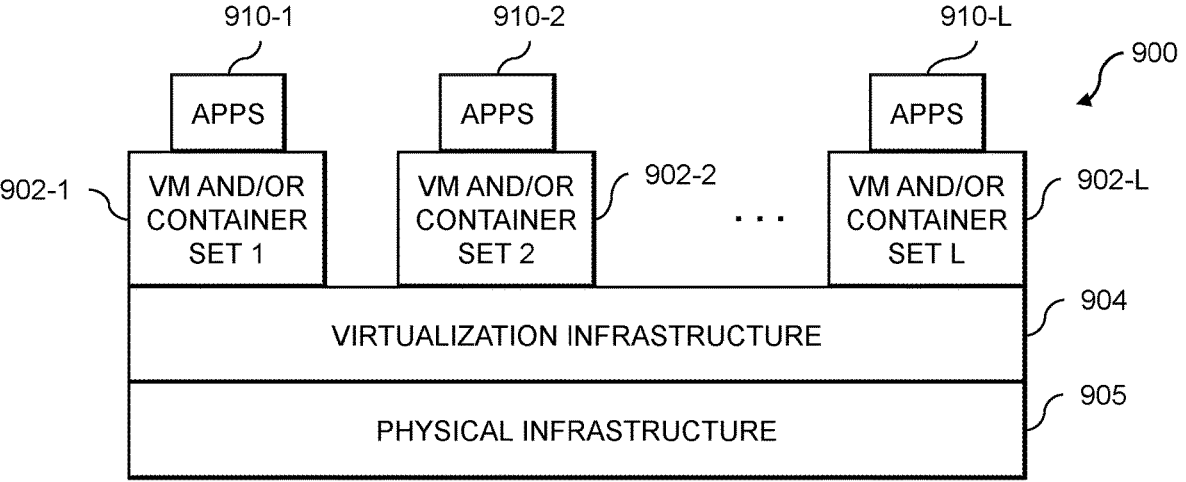
FIGS. 9 and 10 show examples of processing platforms that may be utilized to implement at least a portion of an information processing system in illustrative embodiments.
Figure 10:
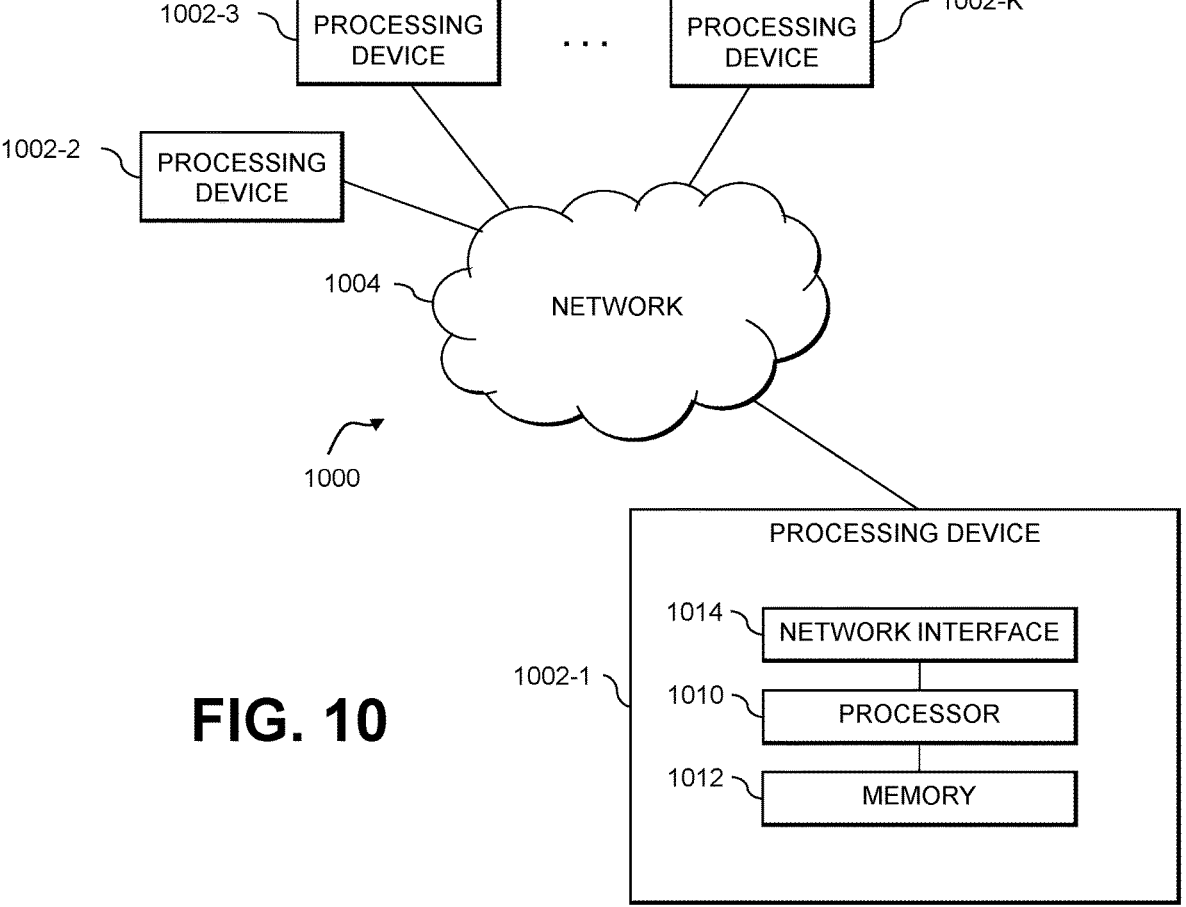

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for establishment and management of service meshes established between virtual computing instances and external devices connected to host devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to receive a request, from an application running on a virtual computing instance, to consume data from an external device coupled to a physical hardware port of a host device, the external device having a first interface with a physical driver running on a host operating system of the host device, the first interface having a first interface type;

to instantiate a second interface on the host operating system of the host device, the second interface having a second interface type, the second interface type being different than the first interface type; and to establish a service mesh for the application running on the virtual computing instance to consume data from the external device coupled to the physical hardware port of the host device by linking the instantiated second interface with (i) a virtual driver running on the virtual computing instance and (ii) the physical driver running on the host operating system of the host device.

2. The apparatus of claim 1 wherein the host device comprises an edge gateway device, and wherein the external device comprises an Internet of Things (IoT) device.

3. The apparatus of claim 1 wherein the external device comprises a peripheral device.

4. The apparatus of claim 1 wherein the external device comprises a sensor device.

5. The apparatus of claim 1 wherein the external device comprises an industrial personal computer device.

6. The apparatus of claim 1 wherein the external device comprises a server.

7. The apparatus of claim 1 wherein the virtual computing instance runs on the host device.

8. The apparatus of claim 1 wherein the virtual computing instance runs on another host device.

9. The apparatus of claim 1 wherein the virtual computing instance comprises a virtual machine.

10. The apparatus of claim 1 wherein the virtual computing instance comprises a software container.

11. The apparatus of claim 1 wherein the virtual computing instance comprises a microservice.

12. The apparatus of claim 1 wherein the second interface comprises a socket plane interface enabling Transport Control Protocol (TCP)/Internet Protocol (IP) communications between (i) the virtual driver running on the virtual computing instance and (ii) the physical driver running on the host operating system of the host device.

13. The apparatus of claim 1 wherein the second interface is associated with a first class type, and wherein the virtual driver is associated with a second class type, wherein the first class type and the second class type correspond to a device type of the external device.

14. The apparatus of claim 1 wherein:

the first interface type comprises at least one of a serial interface, a General Purpose Input/Output (GPIO) interface, a sensor interface, a lab card interface, a video interface, and an audio interface; and the second interface type comprises a socket plane interface.

15. A computer program product comprising a non-transitory processor-readable storage medium having stored therein program code of one or more software programs, wherein the program code when executed by at least one processing device causes the at least one processing device:

to receive a request, from an application running on a virtual computing instance, to consume data from an external device coupled to a physical hardware port of a host device, the external device having a first interface with a physical driver running on a host operating system of the host device, the first interface having a first interface type;

to instantiate a second interface on the host operating system of the host device, the second interface having a second interface type, the second interface type being different than the first interface type; and to establish a service mesh for the application running on the virtual computing instance to consume data from the external device coupled to the physical hardware port of the host device by linking the instantiated second interface with (i) a virtual driver running on the virtual computing instance and (ii) the physical driver running on the host operating system of the host device.

16. The computer program product of claim 15 wherein the host device comprises an edge gateway device, and wherein the external device comprises an Internet of Things (IoT) device.

17. The computer program product of claim 15 wherein the second interface comprises a socket plane interface enabling Transport Control Protocol (TCP)/Internet Protocol (IP) communications between (i) the virtual driver running on the virtual computing instance and (ii) the physical driver running on the host operating system of the host device.

18. A method comprising:

receiving a request, from an application running on a virtual computing instance, to consume data from an external device coupled to a physical hardware port of a host device, the external device having a first interface with a physical driver running on a host operating system of the host device, the first interface having a first interface type;

instantiating a second interface on the host operating system of the host device, the second interface having a second interface type, the second interface type being different than the first interface type; and establishing a service mesh for the application running on the virtual computing instance to consume data from the external device coupled to the physical hardware port of the host device by linking the instantiated second interface with (i) a virtual driver running on the virtual computing instance and (ii) the physical driver running on the host operating system of the host device;

wherein the method is performed using at least one processing device comprising a processor coupled to a memory.

19. The method of claim 18 wherein the host device comprises an edge gateway device, and wherein the external device comprises an Internet of Things (IoT) device.

20. The method of claim 18 wherein the second interface comprises a socket plane interface enabling Transport Control Protocol (TCP)/Internet Protocol (IP) communications between (i) the virtual driver running on the virtual computing instance and (ii) the physical driver running on the host operating system of the host device.

* * * * *